United States Patent
Li et al.

(10) Patent No.: US 9,225,390 B2
(45) Date of Patent: Dec. 29, 2015

(54) WIRELESS POWER SUPPLYING SYSTEM AND ADAPTIVE ADJUSTMENT METHOD THEREOF

(75) Inventors: Dan Li, Shandong (CN); Bing Bai, Shandong (CN); Ying Chen, Shandong (CN); Yilong Xu, Shandong (CN)

(73) Assignee: Haier Group Corporation and Qing Dao Haier Electronic Co., Ltd., Shandong (CN)

( * ) Notice: Subject to any disclaimer, the term of this patent is extended or adjusted under 35 U.S.C. 154(b) by 490 days.

(21) Appl. No.: 13/701,005

(22) PCT Filed: Dec. 23, 2010

(86) PCT No.: PCT/CN2010/080170
§ 371 (c)(1),
(2), (4) Date: Nov. 29, 2012

(87) PCT Pub. No.: WO2011/160406
PCT Pub. Date: Dec. 29, 2011

(65) Prior Publication Data
US 2013/0140907 A1    Jun. 6, 2013

(30) Foreign Application Priority Data

Jun. 24, 2010   (CN) .......................... 2010 1 0208340

(51) Int. Cl.
*H01F 27/42* (2006.01)
*H04B 5/00* (2006.01)
*H02J 7/02* (2006.01)

(52) U.S. Cl.
CPC .............. *H04B 5/0037* (2013.01); *H02J 7/025* (2013.01); *H04B 5/0093* (2013.01)

(58) Field of Classification Search
CPC ...... H02J 7/025; H04B 5/0093; H04B 5/0037
USPC ........................................................ 307/104
See application file for complete search history.

(56) References Cited

U.S. PATENT DOCUMENTS

| | | |
|---|---|---|
| 2004/0218406 A1 | 11/2004 | Jang et al. |
| 2008/0157603 A1 | 7/2008 | Baarman et al. |
| 2009/0174263 A1 | 7/2009 | Baarman et al. |
| 2011/0248674 A1 | 10/2011 | Baarman et al. |
| 2012/0104868 A1 | 5/2012 | Baarman et al. |

FOREIGN PATENT DOCUMENTS

| | | |
|---|---|---|
| CN | 1633010 A | 6/2005 |
| EP | 1493218 B1 | 1/2005 |

(Continued)

*Primary Examiner* — Thienvu Tran
*Assistant Examiner* — Tien Mai
(74) *Attorney, Agent, or Firm* — Andrew Kurth LLP; David Bradin

(57) ABSTRACT

It is disclosed a wireless power supplying system and an self adaptive adjustment method thereof. The method includes: a step for detecting an operating status of an electric power sending unit and determining, based on the detected operating status, whether the electric power transmitting unit satisfies a condition of a normal operation of the system and a step for determining, based on the above determination result, whether to adjust a master frequency of an oscillating circuit so that the master frequency of the oscillating circuit is between a resonance frequency of a transmitting coil and a resonance frequency of a receiving coil. The master frequency of the oscillating circuit is adjusted automatically, so that the master frequency is always close to the resonance frequency of the transmitting coil and that of the receiving coil, thereby maintaining stably the power output of the system.

16 Claims, 3 Drawing Sheets

(56) References Cited

FOREIGN PATENT DOCUMENTS

| | | |
|---|---|---|
| JP | 2001-309578 A | 11/2001 |
| JP | 2004-248365 A | 9/2004 |
| JP | 2010-515425 A | 5/2010 |
| JP | 2010-136464 A | 6/2010 |
| WO | 2008081405 A1 | 7/2008 |
| WO | 2009089253 A1 | 7/2009 |

US 9,225,390 B2

WIRELESS POWER SUPPLYING SYSTEM AND ADAPTIVE ADJUSTMENT METHOD THEREOF

CROSS-REFERENCE TO RELATED APPLICATIONS

This application is a U.S. national phase application under the provisions of 35 U.S.C. §371 of International Patent Application No. PCT/CN2010/080170 filed Dec. 23, 2010, which in turn claims priority of Chinese Patent Application No. 201010208340.5 filed Jun. 24, 2010. The disclosures of such international patent application and Chinese priority patent application are hereby incorporated herein by reference in their respective entireties, for all purposes.

TECHNICAL FIELD

The present invention relates to wireless power supplying technologies, and in particular, to an adaptive adjustment method of a wireless power supplying system and the corresponding wireless power supplying system.

TECHNICAL BACKGROUND

Wireless technologies have been used in the field of information application such as wireless transmission of signals for a long time, but the power transmission characteristic of such technologies has not been properly developed. An electronic device for daily use must be equipped with a dedicated power adapter to electrically connect to the Alternating Current (AC) utility power supply, or be equipped with a battery providing electrical energy to the electronic device. However, since the existing power adapter needs to use a power line to electrically connect to the electronic device, it is extremely inconvenient due to the limitation of the power line when the electronic device is moving. With the development of technology, the wireless power supplying technology has been developed to transmit electrical energy to the electronic device in a wireless manner. Reference is now made to FIG. 1, which depicts a schematic diagram of an existing wireless power supplying system. As shown in FIG. 1, the existing wireless power supplying system 100 includes an electric power transmitting unit 110 and an electric power receiving unit 120. The electric power transmitting unit 110 generally includes a power supply 111, a control circuit 112, an oscillating circuit 113 and a transmitting coil 114. The electric power receiving unit 120 generally includes a receiving coil 121 and a rectifying and filtering circuit 122. The power supply 111 of the electric power transmitting unit 110 is used for converting the AC utility power supply voltage to a Direct Current (DC) voltage required for each of the circuits in the electric power transmitting unit 110 (e.g., the control circuit 112 and the oscillating circuit 113), the oscillating circuit 113 is used to generate a frequency signal, the control circuit 112 is electrically connected to the oscillating circuit 113 to control a master frequency f0 of the frequency signal generated by the oscillating circuit 113, and the transmitting coil 114 generates a resonance frequency f1 based on the master frequency f0 of the frequency signal so as to output the electric power. The receiving coil 121 of the electric power receiving unit 120 is electromagnetically coupled to the transmitting coil 114 to receive the electric power outputted by the electric power transmitting unit 110, so as to generate an AC voltage having a certain resonance frequency f2, and the rectifying and filtering circuit 122 is used for converting that AC voltage to the DC voltage.

However, in order to enable the wireless power supplying system 100 to be operated stably, the master frequency f0 of the frequency signal generated by the control oscillating circuit 113, the resonance frequency f1 of the transmitting coil 114 and the resonance frequency f2 of the receiving coil 121 should be ideally equal (i.e. f0=f1=f2), so that the transmitting coil 114 and the receiving coil 121 can be electromagnetically coupled deeply, so as to generate the electrical energy at the electric power receiving unit 120 to implement wireless power supplying. However, in fact, due to the influences of physical characteristics, application environments and qualities of electrical elements and the like, there exists a shift between the resonance frequency f1 of the transmitting coil 114 and the resonance frequency f2 of the receiving coil 121, which causes a big difference and mismatch between the resonance frequency f1 of the transmitting coil 114 and the resonance frequency f2 of the receiving coil 121, and the deep electromagnetic coupling may not be enabled, and therefore the output power of the wireless power supplying system 100 is unstable, that is, the wireless power supplying system cannot operate normally.

SUMMARY OF THE INVENTION

An object of the present invention is to provide an adaptive adjustment method of a wireless power supplying system, which is capable of automatically adjusting the master frequency, so that the master frequency is always close to the resonance frequency of the transmitting coil of the electric power transmitting unit and the resonance frequency of the receiving coil of the electric power receiving unit, which can stabilize the power output of the system so as to achieve a relatively stable system.

The object of the present invention is also to provide a wireless power supplying system having an adaptive adjustment function, which is capable of automatically adjusting the master frequency, so that the master frequency is always close to the resonance frequency of the transmitting coil of the electric power transmitting unit and the resonance frequency of the receiving coil of the electric power receiving unit, which can stabilize the power output of the system so as to achieve a relatively stable system.

To achieve above advantages, it is provided an adaptive adjustment method of a wireless power supplying system, the wireless power supplying system comprises an electric power transmitting unit, the electric power transmitting unit includes a power supply, an oscillating circuit, a control circuit and a transmitting coil, the oscillating circuit generates a frequency signal having a master frequency, an induction between the transmitting coil and a receiving coil of an electric power receiving unit generates an electrical energy, the adaptive adjustment method comprises: a step for detecting an operating status of the electric power transmitting unit and determining, based on the detected operating status, whether the electric power transmitting unit satisfies a condition of a normal operation of the wireless power supplying system; and a step for determining, based on the above determination result, whether to adjust the master frequency of the oscillating circuit so that the master frequency of the oscillating circuit is between a resonance frequency of the transmitting coil and a resonance frequency of the receiving coil.

Preferably, the step for detecting an operating status of the electric power transmitting unit and determining, based on the detected operating status, whether the electric power transmitting unit satisfies a condition of the normal operation of the wireless power supplying system comprises: a step A for detecting an amplitude of present current in the transmitting coil; and a step B for determining whether the present current in the transmitting coil is within a normal operating current range of the transmitting coil in a normal operation of the wireless power supplying system.

Preferably, the step for determining, based on the above determination result, whether to adjust the master frequency of the oscillating circuit so that the master frequency of the oscillating circuit is between a resonance frequency of the transmitting coil and a resonance frequency of the receiving coil comprises: a step C for determining, based on above determination result in the step B, whether to adjust the master frequency of the oscillating circuit so that the present current in the transmitting coil is within its normal operating current range.

Preferably, the normal operating current range of the transmitting coil is between a permitted minimum current value and a permitted maximum current value.

Preferably, the step B includes: a step B1 for determining whether the present current in the transmitting coil is larger than the permitted minimum current value in its normal operating current range and is less than the permitted maximum current value in its normal operating current range; and a step B2 for determining that the present current in the transmitting coil is within its normal operating current range when the above determination result in the step B1 shows that the present current in the transmitting coil is larger than the permitted minimum current value in its normal operating current range and is less than the permitted maximum current value in its normal operating current range; otherwise, determining that the present current in the transmitting coil is not within its normal operating current range.

Preferably, in the step C, if it is necessary to adjust the master frequency of the oscillating circuit so that the present current in the transmitting coil is within its normal operating current range, the step C further includes: a step C1 for increasing the master frequency of the oscillating circuit by one fixed frequency offset; a step C2 for detecting the current in the transmitting coil, and employing this current as a positively-adjusted current; a step C3 for determining whether the positively-adjusted current is larger than the present current in the transmitting coil before the master frequency is adjusted, and a step C4 for employing the positively-adjusted current as the present current in the transmitting coil when the above determination result in the step C3 shows that the positively-adjusted current is larger than the present current in the transmitting coil and returning to the step B; otherwise, decreasing the master frequency of the oscillating circuit by two fixed frequency offsets, detecting the current in the transmitting coil, employing this current as a negatively-adjusted current, employing the negatively-adjusted current as the present current in the transmitting coil, and returning to the step B.

Preferably, before the step B, the method further comprises: a step D1 for determining whether the present current in the transmitting coil exceeds the permitted maximum current value in the normal operating current range of the transmitting coil; and a step D2 for issuing an alarm or turning off the wireless power supplying system automatically when the above determination result in the step D1 shows that the present current in the transmitting coil exceeds the permitted maximum current value; otherwise, performing the step B.

The present invention also provides an adaptive adjustment method of a wireless power supplying system, the wireless power supplying system comprises an electric power transmitting unit and an electric power receiving unit, the electric power transmitting unit includes an oscillating circuit and a transmitting coil, the oscillating circuit generates a frequency signal having a master frequency, the electric power receiving unit comprises a receiving coil, an induction between the transmitting coil and the receiving coil generates an electrical energy, the adaptive adjustment method comprises: a step E for detecting a change of an operating status of the electric power transmitting unit; and a step F for controlling an adjustment of the master frequency according to the change of the operating status of the electric power transmitting unit, so that the master frequency is always close to the changed resonance frequency of the transmitting coil of the electric power transmitting unit and to the changed resonance frequency of the receiving coil of the electric power receiving unit, thereby stabilizing the power output of the system. The present invention further provides a wireless power supplying system having an adaptive adjustment function, comprises: an electric power transmitting unit and an electric power receiving unit. The electric power transmitting unit includes a power supply, an oscillating circuit, a control circuit and a transmitting coil, wherein the power supply is used for converting an AC utility power supply voltage into a DC voltage required for each of the circuits, the oscillating circuit is used for generating a frequency signal having a master frequency, the control circuit is electrically connected to the oscillating circuit to adjust the master frequency of the oscillating circuit, and the transmitting coil generates an oscillation frequency based on the master frequency of the oscillating circuit to transmit the electrical energy. The electric power receiving unit is used for receiving the electrical energy transmitted by the electric power transmitting unit. The control circuit includes a current detection circuit, a determination circuit and a processor. The current detection circuit is used for detecting the present current in the transmitting coil, the determination circuit is used for determining whether the present current in the transmitting coil is within a normal operating current range of the transmitting coil in a normal operation of the wireless power supplying system, and the processor is electrically connected to the determination circuit and the oscillating circuit, to determine, based on the above determination result, whether to adjust the master frequency of the oscillating circuit so that the present current in the transmitting coil is within its normal operating current range.

The adaptive adjustment method of the wireless power supplying system and the wireless power supplying system with the adaptive adjustment function of the present invention can automatically adjust the master frequency so that the master frequency is always close to the resonance frequency of the transmitting coil and to the resonance frequency of the receiving coil, therefore the power output of system can be maintained stably, which ensures the wireless power supplying system to be operated stably.

The above illustration is only an overview of the technical solution of the present invention, in order to be able to better understand the technical means of the present invention so as to be implemented in accordance with the contents of the specification, and in order to allow the above and other purposes, features, and advantages of the present invention to be more apparent, the following preferred embodiments will be discussed in conjunction with accompanying drawings as follows.

DETAILED DESCRIPTION OF PREFERRED EMBODIMENTS

To further illustrate the technical means of the present invention taken to achieve a predetermined purpose of the invention and the effectiveness thereof, specific embodiments, structures, features and effectiveness of the wireless power supplying system having an adaptive adjustment function and its adaptive adjustment method according to the present invention will be described in detail as follows in conjunction with the accompanying drawings and preferred embodiments.

Figure 1:
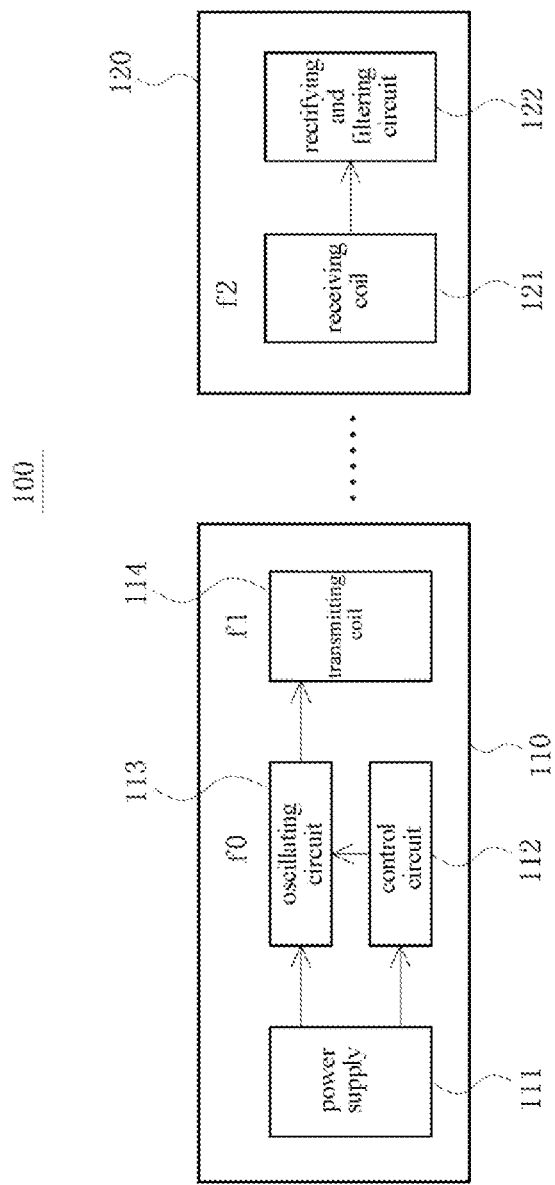
FIG. 1 is a schematic diagram of an existing wireless power supplying system.
Figure 2:
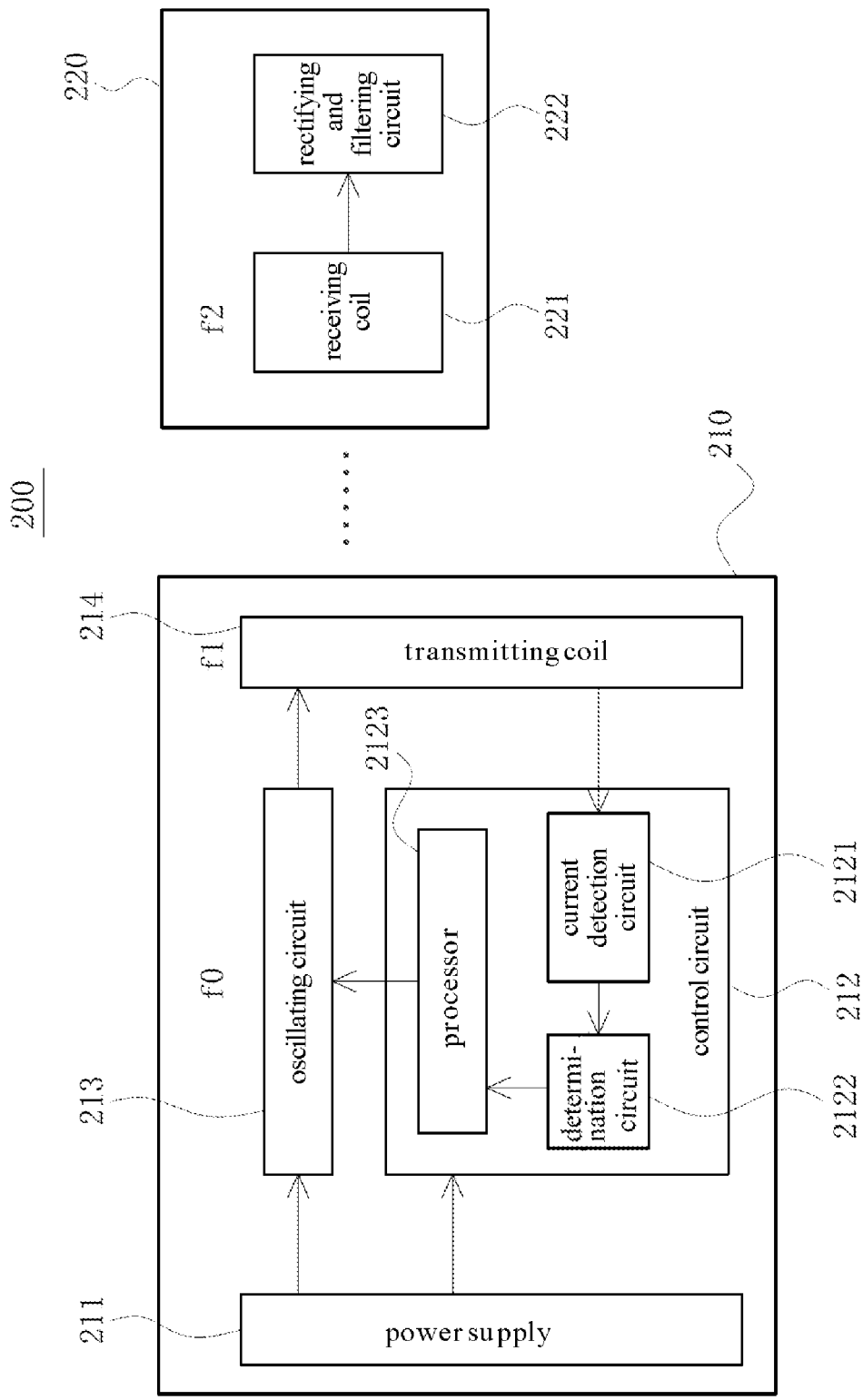
FIG. 2 is a schematic diagram of a wireless power supplying system having an adaptive adjustment function according to an embodiment of the present invention.

Reference is now made to FIG. 2, which depicts a schematic diagram of a wireless power supplying system having an adaptive adjustment function according to an embodiment of the present invention. As shown in FIG. 2, a wireless power system 200 is similar to the wireless power supplying system 100 as shown in FIG. 1, and also includes an electric power transmitting unit 210 and an electric power receiving unit 220. The electric power transmitting unit 210 includes a power supply 211, a control circuit 212, an oscillating circuit 213 and a transmitting coil 214, and the electric power receiving unit 220 includes a receiving coil 221 and a rectifying and filtering circuit 222. These electronic elements are similar to the electronic elements as shown in FIG. 1, and will not be discussed in detail here.

Further, the control circuit 212 further includes a current detection circuit 2121, a determination circuit 2122, and a processor 2123. The current detection circuit 2121 is electrically connected to the transmitting coil 214 to detect present current in the transmitting coil 214, the determination circuit 2122 is electrically connected to the current detection circuit 2121 to determine whether the present current in the transmitting coil 214 is within a normal operating current range of the transmitting coil 214 in a normal operation of the wireless power supplying system 200, and the processor 2123 is electrically connected to the determination circuit 2122 and the oscillating circuit 213 to determine, based on the above determination result, whether to adjust the master frequency f0 of the oscillating circuit 213 so that the master frequency f0 is between a resonance frequency f1 of the transmitting coil 214 and a resonance frequency f2 of the receiving coil 221, to stabilize the output power of the system.

The wireless power supplying system 100 having an adaptive adjustment function of the present invention determines whether its resonance frequency f1 matches with the resonance frequency f2 of the receiving coil 221 t the current flowed into the transmitting coil 214. If the resonance frequency f1 and the resonance frequency f2 are not matched, then the master frequency f0 of the oscillating circuit 213 is adjusted so that the master frequency f0 is between the resonance frequency f1 of the transmitting coil 214 and the resonance frequency f2 of the receiving coil 221, thereby adjusting the output power of the transmitting coil 214, and at the same time making the master frequency f0 be maintained close to the resonance frequency f1 of the transmitting coil 214 and to the resonance frequency f2 of the receiving coil 221, thereby enabling the wireless power supplying system 100 to maintain the stable power output and operate stably and normally.

Further, in order to enable the two coils to be electromagnetic coupled deeply, there is a requirement to define a permitted minimum current value Imin and a permitted maximum current value Imax. When the current I in the coil is greater than the permitted minimum current value Imin and less than the permitted maximum current value Imax, the resonance frequencies of both of the coils are close to each other, the wireless power system 200 can operate normally, and the electric power can be transmitted stably. In other words, the normal operating current range of the coil is between the permitted minimum current value Imin and the permitted maximum current value Imax, and the resonance frequency at which the electric power can be transmitted stably by the coil is between two critical resonance frequencies corresponding to the permitted minimum current value Imin.

The present invention also provides an adaptive adjustment method of the wireless power system, and the method is to determine whether a frequency offset shall be compensated in the oscillating circuit 213 based on an amplitude of the current flowing in the transmitting coil. By adjusting the master frequency of the oscillating circuit 213, the inflow current to the transmitting coil 214 is maintained within an appropriate range to meet the operational needs. That is, the adjustment of the master frequency is controlled by the detected and determined operation condition of the electric power transmitting unit 210 (current, electric power, etc.), so that the master frequency is always close to the changed resonance frequency of the coil of the electric power transmitting unit 210 and to the changed resonance frequency of the coil of the electric power receiving unit 220, thereby stabilizing the power output of the system.

Figure 3:
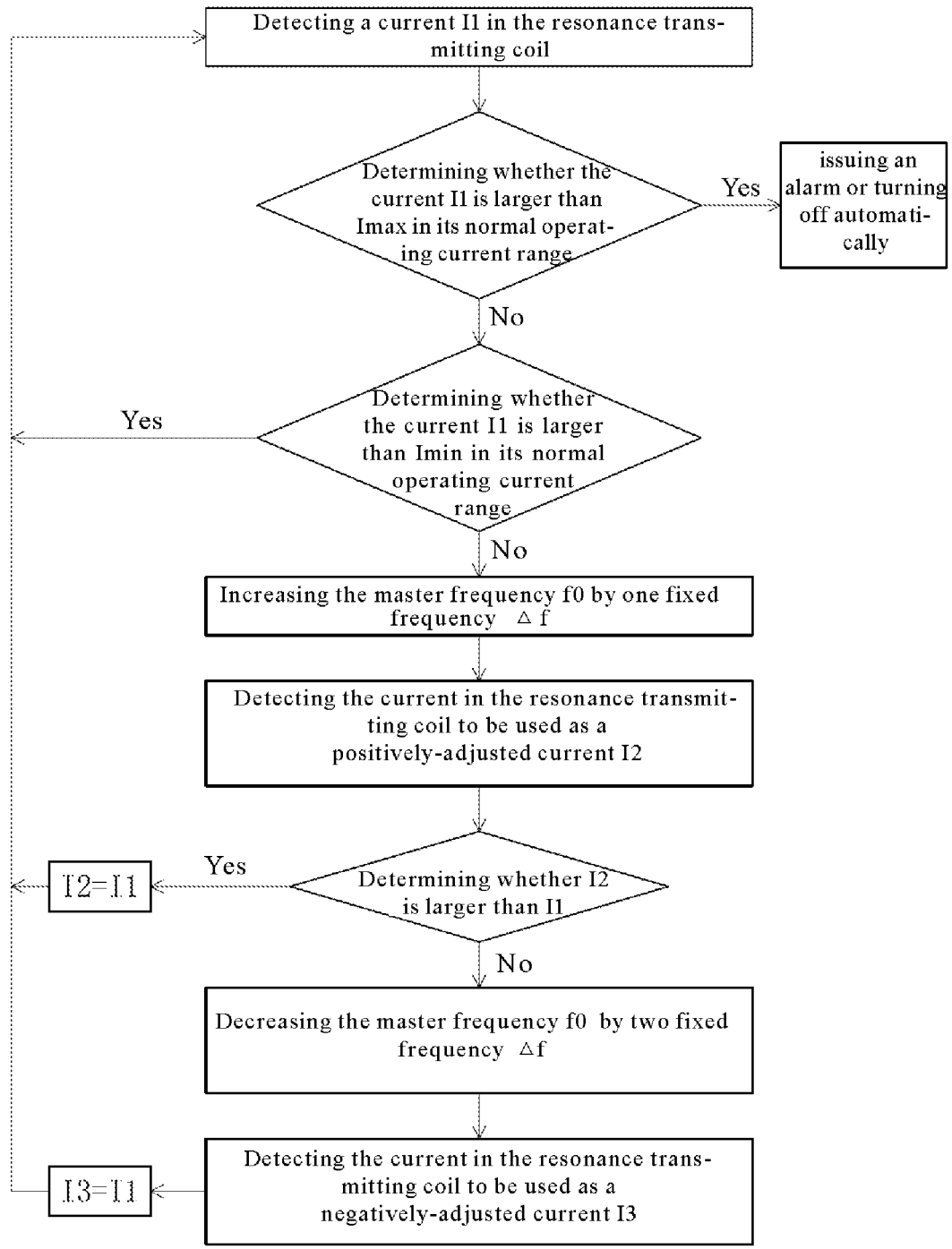
FIG. 3 is a schematic diagram of an adaptive adjustment method of a wireless power supplying system according to an embodiment of the present invention.

In particular, reference is now made to FIG. 3 which depicts a schematic diagram of the adaptive adjustment method of the wireless power supplying system according to an embodiment of the present invention. As shown in FIG. 3, the method includes detecting a present current I1 in the transmitting coil 214 by the current detection circuit 2121. Then, the determination circuit 2122 determines whether the present current I1 in the transmitting coil 214 exceeds the permitted maximum current value Imax in the normal operating current range of the transmitting coil. Since the current of the coil is not allowed to exceed the permitted maximum current value during its electromagnetic coupling, it means that the wireless power supplying system 200 is in a dangerous state when the above determination result shows that the present current I1 in the transmitting coil 214 exceeds the permitted maximum current value Imax, then an alarm should be issued or the wireless power supplying system 200 should be turned off automatically. Otherwise, the determination circuit 2122 continues to determine whether the present current I1 in the transmitting coil 214 is within its normal operating current range.

Specifically, the determination circuit 2122 determines whether the present current I1 in the transmitting coil 214 is greater than the permitted minimum current value Imin of its normal operating current range. When the present current I1 in the transmitting coil 214 is greater than the permitted minimum current value Imin, it means that the present current I1 in the transmitting coil 214 is within its normal operating range, and then the wireless power system 200 can be operated stably. Otherwise, when the present current I1 in the transmitting coil 214 is less than the permitted minimum current value Imin, it means that the present current I1 is not within the normal operating current range, and then the processor 2123 outputs a control signal to adjust the master frequency f0 of the oscillating circuit 213, so that the present current I1 in the transmitting coil 214 is adjusted to be within its normal operating current range.

First, the master frequency f0 of the oscillating circuit 213 is increased by one fixed frequency offset Δf. Then, the present current (namely positively-adjusted current) I2 in the transmitting coil 214 is detected by the current detection circuit 2121. Next, it is determined whether this present positively-adjusted current I2 is greater than the present current I1 in the transmitting coil 214 by the determination circuit 2122. When the positively-adjusted current I2 is greater than the present current I1, it means that the above adjustment direction for the master frequency f0 of the oscillating circuit 213 is correct. At this time, the positively-adjusted current I2 can be used as the present current I1 in the transmitting coil 214, and it is continued to determine whether this present current I1 (i.e. the positively-adjusted current I2) is in the normal operating current range, and if not, the adjustment is conducted continuously.

In contrast, when the positively-adjusted current I2 is less than the present current I1, it means that the above adjustment direction for the master frequency f0 of the oscillating circuit 213 is incorrect. Then, the present master frequency f0 of the oscillating circuit 213 is decreased by two fixed frequency offsets Δf (i.e., reverse-direction adjustment by 2Δf), and the present current (namely negatively-adjusted current) I3 in the transmitting coil 214 is detected, and the negatively-adjusted current I3 is used as the present current I1 in the transmitting coil 214, and then it is also continued to determine whether this present current I1 (i.e. the negatively-adjusted current I3) is in the normal operating current range, and if not, it continues to adjust again. By analogy, the present current I1 in the transmitting coil 214 can be gradually adjusted to the normal current range according to present invention, that is, it allows the present current to be between the permitted maximum current value Imax and the permitted minimum current value Imin.

In summary, the wireless power supplying system and its adaptive adjustment method of the present invention can automatically adjust the master frequency, so that the master frequency is always between the resonance frequency f1 of the transmitting coil 214 and the resonance frequency f2 of the receiving coil 222, thereby allowing the power output of the system to be maintained stably, so as to ensure that the wireless power supplying system can always operate normally and stably.

The above description is merely the preferred embodiments of the present invention, and it is not intended to act as any form of limitation for the present invention. Although the present invention has been disclosed with the above preferred embodiment, the embodiment is not intended to limit the present invention. Those skilled in the art can amend and modify the above disclosed technical content as equivalent embodiments with equivalent variation, without departing from the scope of the technical solution of the present invention. However, the contents without departing from the technical solution of the present invention, any of simple amendments, equivalent variations and modifications for the above embodiments based on the technical essence of the present invention, should fall into the scope of the technical solution of the present invention.

INDUSTRIAL APPLICABILITY OF INVENTION

The adaptive adjustment method of the wireless power supplying system and the wireless power supplying system with the adaptive adjustment function of the present invention can automatically adjust the master frequency so that the master frequency is always close to the resonance frequency of the transmitting coil and to the resonance frequency of the receiving coil, therefore the power output of system can be maintained stably, which ensures the wireless power supplying system to be operated stably.

The invention claimed is:

1. An adaptive adjustment method of a wireless power supplying system, wherein the wireless power supplying system comprises an electric power transmitting unit, the electric power transmitting unit includes a power supply, an oscillating circuit, a control circuit and a transmitting coil, the oscillating circuit generates a frequency signal having a master frequency, an induction between the transmitting coil and a receiving coil of an electric power receiving unit generates an electrical energy, and the adaptive adjustment method comprises:
a step for detecting an operating status of the electric power transmitting unit and determining, based on the detected operating status, whether the electric power transmitting unit satisfies a normal operation condition of the wireless power supplying system; and
a step for determining, based on the above determination result, whether to adjust the master frequency of the oscillating circuit so that the master frequency of the oscillating circuit is between a resonance frequency of the transmitting coil and a resonance frequency of the receiving coil.

2. The method of claim 1, wherein the step of detecting an operating status of the electric power transmitting unit and determining, based on the detected operating status, whether the electric power transmitting unit satisfies a normal operation condition of the wireless power supplying system comprises:
a step A for detecting an amplitude of a present current in the transmitting coil; and
a step B for determining whether said present current in the transmitting coil is within a normal operating current range of the transmitting coil in a normal operation of the wireless power supplying system.

3. The method of claim 2, wherein the step of determining, based on the above determination result, whether to adjust the master frequency of the oscillating circuit so that the master frequency of the oscillating circuit is between a resonance frequency of the transmitting coil and a resonance frequency of the receiving coil comprises:
a step C for determining, based on the above determination result in the step B, whether to adjust the master frequency of the oscillating circuit so that said present current in the transmitting coil is within its normal operating current range.

4. The method of claim 3, wherein the normal operating current range of the transmitting coil is between a permitted minimum current value and a permitted maximum current value.

5. The method of claim 3, wherein the step B comprises:
a step B1 for determining whether said present current in the transmitting coil is larger than the permitted minimum current value in its normal operating current range and is less than the permitted maximum current value in its normal operating current range; and
a step B2 for determining that said present current in the transmitting coil is within its normal operating current range when the above determination result in the step B1 shows that said present current in the transmitting coil is larger than the permitted minimum current value in its normal operating current range and is less than the permitted maximum current value in its normal operating current range; otherwise, determining that said present current in the transmitting coil is not within its normal operating current range.

6. The method of claim 5, wherein in the step C, if it is necessary to adjust the master frequency of the oscillating circuit so that said present current in the transmitting coil is within its normal operating current range, the step C further includes:
   a step C1 for increasing the master frequency of the oscillating circuit by one fixed frequency offset;
   a step C2 for detecting the current in the transmitting coil, and employing the detected current as a positively-adjusted current;
   a step C3 for determining whether the positively-adjusted current is larger than said present current in the transmitting coil before the master frequency is adjusted; and
   a step C4 for employing the positively-adjusted current as said present current in the transmitting coil when the above determination result in the step C3 shows that the positively-adjusted current is larger than said present current in the transmitting coil and returning to the step B; otherwise, decreasing the master frequency of the oscillating circuit by two fixed frequency offsets, detecting the current in the transmitting coil, employing the detected current as a negatively-adjusted current, employing the negatively-adjusted current as said present current in the transmitting coil, and returning to the step B.

7. The method of claim 5, wherein before performing the step B, the method further comprises:
   a step D1 for determining whether said present current in the transmitting coil exceeds the permitted maximum current value in the normal operating current range of the transmitting coil; and
   a step D2 for issuing an alarm or turning off the wireless power supplying system automatically when the above determination result in the step D1 shows that said present current in the transmitting coil exceeds the permitted maximum current value; otherwise, performing the step B.

8. An adaptive adjustment method of a wireless power supplying system, the wireless power supplying system comprises an electric power transmitting unit and an electric power receiving unit, the electric power transmitting unit includes an oscillating circuit and a transmitting coil, the oscillating circuit generates a frequency signal having a master frequency, the electric power receiving unit includes a receiving coil, an induction between the transmitting coil and the receiving coil generates an electrical energy, the adaptive adjustment method comprises:
   a step E for detecting a change of an operating status of the electric power transmitting unit; and
   a step F for controlling an adjustment of the master frequency according to the change of the operating status of the electric power transmitting unit, so that the master frequency is always close to the changed resonance frequency of the transmitting coil of the electric power transmitting unit and to the changed resonance frequency of the receiving coil of the electric power receiving unit.

9. The method of claim 8, wherein the step E comprises: detecting an amplitude of the present current in the transmitting coil.

10. The method of claim 9, wherein a normal operating current range of the transmitting coil is between a permitted minimum current value and a permitted maximum current value.

11. The method of claim 10, wherein the step F comprises:
    a step F1 for determining whether said present current in the transmitting coil is larger than the permitted minimum current value in its normal operating current range and is less than the permitted maximum current value in its normal operating current range;
    a step F2 for determining that said present current in the transmitting coil is within its normal operating current range when the above determination result in the step F1 shows that said present current in the transmitting coil is larger than the permitted minimum current value in its normal operating current range and is less than the permitted maximum current value in its normal operating current range, and returning to the step E; and
    otherwise when the above determination result in the step F1 shows that said present current in the transmitting coil is not larger than the permitted minimum current value in its normal operating current range or is not less than the permitted maximum current value in its normal operating current range, a step F3 for determining that said present current in the transmitting coil current is not within its normal operating current range, and adjusting the master frequency of the oscillating circuit so that said present current in the transmitting coil is within its normal operating current range.

12. The method of claim 11, wherein the step F3 comprises:
    a step F31 for decreasing the master frequency of the oscillating circuit by one fixed frequency offset;
    a step F32 for detecting the current in the transmitting coil, and employing said current as a positively-adjusted current;
    a step F33 for determining whether the positively-adjusted current is larger than said present current in the transmitting coil before the master frequency is adjusted;
    a step F34 for employing the positively-adjusted current as said present current in the transmitting coil when the above determination result in the step F33 shows that the positively-adjusted current is larger than said present current in the transmitting coil and returning to the step E; otherwise, when the above determination result in the step F33 shows that the positively-adjusted current is not larger than said present current in the transmitting coil, decreasing the master frequency of the oscillating circuit by two fixed frequency offsets, detecting said current in the transmitting coil, employing said current as a negatively-adjusted current, employing the negatively-adjusted current as said present current in the transmitting coil, and returning to the step E.

13. The method of claim 10, wherein before performing the step F, the method further comprises:
    a step G1 for determining whether said present current in the transmitting coil exceeds the permitted maximum current value in the normal operating current range of the transmitting coil; and
    a step G2 for issuing an alarm or turning off the wireless power supplying system automatically when the above determination result in the step G1 shows that said present current in the transmitting coil exceeds the permitted maximum current value; otherwise, performing the step E.

14. A wireless power supplying system having an adaptive adjustment function comprises:
    an electric power transmitting unit, which includes a power supply, an oscillating circuit, a control circuit and a transmitting coil, the oscillating circuit is used for generating a frequency signal having a master frequency, an induction between the transmitting coil and a receiving coil of an electric power receiving unit generates an electrical energy;

the control circuit detects an operating status of the electric power transmitting unit, and determines, based on the detected operating status, whether the electric power transmitting unit satisfies a condition of a normal operation of the wireless power supplying system; and the control circuit determines, based on the above determination result, whether to adjust the master frequency of the oscillating circuit so that the master frequency of the oscillating circuit is between a resonance frequency of the transmitting coil and a resonance frequency of the receiving coil.

15. The system of claim 14, wherein the power supply is used for converting an AC utility power supply voltage into a DC voltage as required, the oscillating circuit is electrically connected to the power supply and the control circuit and is used to generate the master frequency; the control circuit is electrically connected to the oscillating circuit to adjust the master frequency of the oscillating circuit; and the transmitting coil generates an oscillation frequency based on the master frequency of the oscillating circuit to transmit the electrical energy.

16. The system of claim 15, wherein the control circuit includes:

a current detection circuit for detecting said present current in the transmitting coil;

a determination circuit for determining whether said present current in the transmitting coil is within a normal operating current range of the transmitting coil in the normal operation of the wireless power supplying system; and a processor, which is electrically connected to the determination circuit and the oscillating circuit, for determining, based on the above determination result, whether to adjust the master frequency of the oscillating circuit so that said present current in the transmitting coil is within its normal operating current range.

* * * * *